April 13, 1937.  J. A. BRADY  2,077,208

CONTAINER

Filed July 17, 1936

James A. Brady
INVENTOR

BY Frank P. Wentworth
his ATTORNEY

Patented Apr. 13, 1937

2,077,208

UNITED STATES PATENT OFFICE 2,077,208

CONTAINER

James A. Brady, Ramsey, N. J.

Application July 17, 1936, Serial No. 91,150

6 Claims. (Cl. 119—23)

The invention relates to containers, and more particularly to a metallic container adapted for use in the distribution of merchandise, which is so constructed that after the removal of the merchandise therefrom, the container may be used as an outdoor nesting place for wild birds.

It is essential, in a container embodying the invention, that the construction be such as to protect the commodities packaged therein during the transportation, storage and use of same; that free access may be had to the container for removing such merchandise therefrom, and that the parts of the container be so formed and so adjustable in relation to each other as to permit the free ingress and egress of birds during the nesting period and the application thereto of means to facilitate the use of the container by the birds.

A container embodying the invention includes therein an inner shell adapted to receive the merchandise, an outer shell and an intermediate stratum of insulating material to prevent the overheating of the container when it is used as a bird house. The two shells and the intermediate insulating liner have openings adapted to be brought into register, one with the other, which shells are relatively movable so that in the distribution of merchandise the openings can be completely closed.

Adjacent the top of the outer shell, which projects above the inner shell, are air openings permitting ventilation of the container when in use as a bird house, and the top of the inner shell is closed by a removable cover positioned below these ventilating openings.

The outer shell is provided with a cover removably secured thereto in a manner which will permit the suspension of the container from this cover, and form a roof-like closure above the ventilator openings preferably having a portion thereof, immediately above the container, protected by an inner stratum of insulation.

When the two shells are adjusted to adapt the container for use as a bird house, relative movement of these parts is prevented by a tubular key member having a projecting rod which serves as a perch to facilitate the ingress and egress of birds to and from the inner shell by means of the opening in which the key member is frictionally supported.

The container may be used for merchandising cigars, cigarets, other tobacco products, candy, bird seed, animal foods and various other kinds of small articles, and when the container has been emptied of such merchandise, it may be placed in any desired location out of doors to provide a haven for wild birds.

The container is so constructed as to not only be substantially weather tight, but to permit the suspension thereof from the limb of a tree by means of the outer cover without likelihood of the separation of the cover from the body, with a resultant falling of the body to the ground. Attachments may be provided to permit the mounting of the container upon the wall of a building or the side of a post.

The inner and outer shells are preferably separable so as to permit the removal and cleaning of the inner shell after the nesting season is over.

It is a well known fact that nesting birds have their own natural enemies such as blue jays, sparrows, cats and squirrels, and the construction of the container is such as to protect the nests of birds from such marauders.

While the advertising value arising from the use of such containers in merchandising various products is a matter of considerable importance, it is essential that the structure of the container be such as to permit its production at a low cost, any increase in cost being offset by the advertising value of the package.

The invention consists primarily in a container embodying therein inner and outer metal shells each having an open top, a liner of insulating material between said shells, said shells and said liner having openings therein, and said shells being relatively movable, whereby said openings may be brought into or out of registering position, a closure for said outer shell, complementary means upon said outer shell and said closure whereby said closure may be firmly connected with the shells, and means whereby said container may be supported out of doors; and in such other novel structural characteristics as are hereinafter set forth and described, and more particularly pointed out in the claims hereto appended.

Referring to the drawing.

Like numerals refer to like parts throughout the several views.

Figure 1:
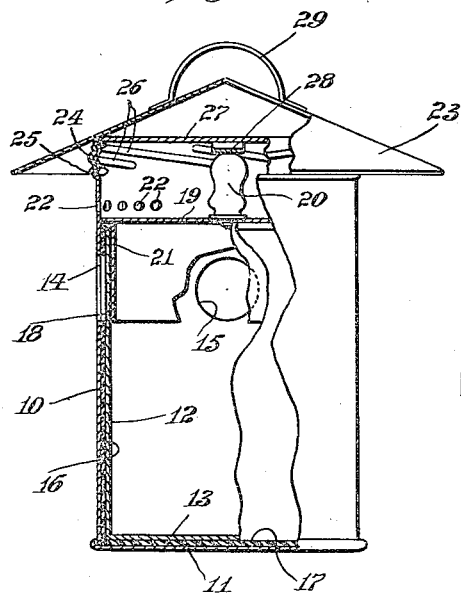
Fig. 1 is a side view of a container embodying the invention shown partly in section.

In the embodiment of the invention shown in the drawing, the container is composed of an outer shell 10 having an imperforate bottom 11 and an inner shell 12 having an imperforate bottom 13. Each shell has an open top.

In the side wall of the shell 10 is an opening 14, the dimensions of which will be determined by the species of birds for whom it is desired to provide a house. This opening is positioned well above the bottom of the shell. The inner shell 12 is provided with a similar opening 15.

Figure 2:
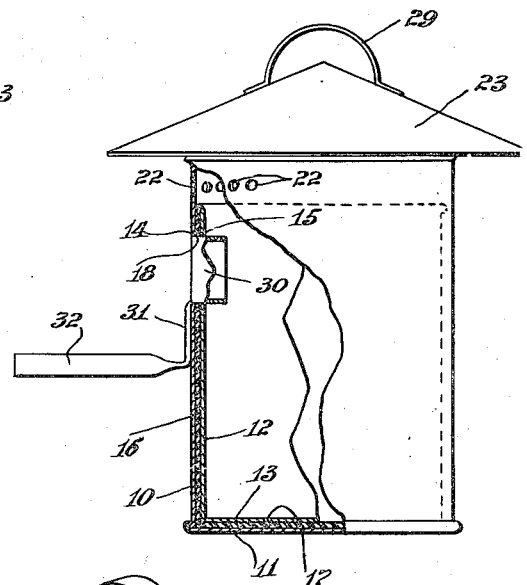
Fig. 2 is a similar view with the key member supporting the perch in position.
Figure 3:
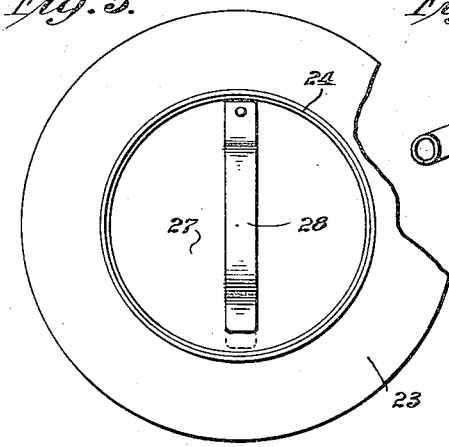
Fig. 3 is a bottom plan view of the outer closure.
Figure 4:
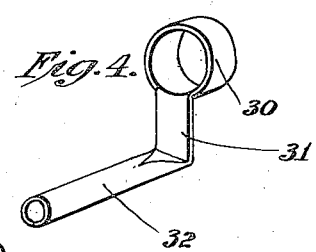
Fig. 4 is a view of the key and perch member.
Figure 5:
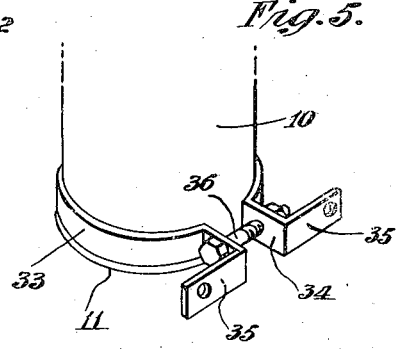
Fig. 5 is a detail view of the lower part of a container illustrating a different manner of supporting a container when in use as a bird house.

While the device is in use as a container for merchandise, the inner shell 12 is so turned in relation to the outer shell 10 as to close both openings 14 and 15. After the contents of the container have been removed and it is desired to use it as a bird house, the two openings are brought into register with each other so as to form a means of ingress or egress for birds nesting in the house. The former adjustment of parts is shown in Fig. 1 and the latter adjustment of parts is shown in Fig. 2.

Between the two shells 10 and 12 is a stratum 16 of insulating material such as paper, fiber board or any other desired material, and the bottom of the shell 10 is provided with a disc 17 of similar insulating material. The side insulation 16 has an opening 18 therethrough adapted to register with the openings 14 and 15. If desired, the insulating liner may be cemented to the outer shell with the opening 18 in register with the opening 14, as shown in Fig. 1.

The open top of the inner shell 12 is closed by a removable slip cover 19 provided with a handle 20 and with a skirt 21 which may be of a depth to close the opening 15. This, however, is not essential.

By having the two shells 10 and 12 relatively movable as to each other, the container, when used for the distribution of merchandise, may be effectively closed so as to protect such merchandise.

To adapt the container for use as a bird house, I use an inner shell 12 considerably shorter than the outer shell so as to provide space not only for the handle 20, but for the formation of ventilator openings 22 above the closure 19, these ventilator openings being effective only while the container is in use as a bird house.

The top of the outer shell 10 is closed by means of a cone shaped cover 23 of a diameter considerably greater than the diameter of said shell, so as to provide an overhanging edge preventing the accumulation of water upon the top and the dripping of this water along the sides of said shell.

This cover is provided with a pendent skirt 24 having screw threads or other suitable attaching devices 25 co-operating with complementary devices 26 formed adjacent the top of the outer shell. Secured within this shell in any desired manner is a heavy sheet of insulating material 27, carried by which is a spring member 28 adapted to engage the handle 20 and prevent displacement of the inner cover 19. The closure 23 is provided with a bail 29 or other device by means of which the container may be suspended from the limb of a tree when used out of doors.

The openings 14, 15 and 18 have dimensions which will adapt the container, when in use as a bird house, to birds of a size which it is intended to attract to the house, and the location of the openings is such as to permit the building of a nest well below same.

A container embodying the invention, when used as a bird house and suspended in the manner described, is subject to constant and sometimes violent movement during storms, and such movement might cause relative movement of the two shells 10 and 12 in a manner to prevent ingress to or egress from the nest. To prevent this, I provide a key member adapted to pass through the registered openings 14, 15 and 18 and thus lock said shells in their adjusted position.

In the form of the invention shown, this key member consists of a short tubular or ring member 30 adapted to frictionally engage the walls of either or both of the openings 14—15. This tubular or ring member has a pendent portion 31 carrying a small straight section 32 extending radially of the container which serves as a perch positioned exteriorly of the container below but adjacent the openings through the key ring member 30.

It may be desired to mount the container for use as a bird house upon a side wall, post, arbor or in some other fixed relation, and to permit this I provide a clamp ring 33 having projecting tongues 34 provided with side wings 35 having nail or screw openings therethrough. The parts 34 are drawn together to clamp the ring proper upon the shell 10 by means of a bolt 36.

The inner shell 12, when the container is to be used for merchandising, is turned so as to bring the opening 15 out of alinement with the openings 14 and 18, and the merchandise is then packed within this inner shell and the cover 19 applied thereto. Since the top of the inner shell is below the ventilator openings 22, the contents of said shell are protected from moisture. The outer closure 23 is then applied to the outer shell 10 and the key member 30 and the clamp ring 33 are stored within the space about the handle 20 and between the inner cover 19 and the outer cover 23.

After the contents of the container have been consumed, the inner closure 19 is discarded, and the inner shell may be removed from the outer shell and thoroughly cleaned. When replacing the inner shell, it is adjusted circumferentially so as to bring the opening 15 into register with the openings 14 and 18. The key member 33 is then inserted in these openings and the outer closure 23 having been firmly secured to the shell 10, the container may be suspended by the bail 29 from the branch of a tree by means of wire or in any other desired manner.

The two shells may be made of various sizes and various shapes so long as they may be adjusted so as to bring the openings through the side walls thereof into or out of register according to the use to which the container is to be put at the time. As stated, the side openings 14, 15 and 18 must be of a size to prevent the entrance of larger birds or squirrels.

I have found, by actual experience, that the smaller birds do not hesitate to build their nests in such containers, even when crudely made.

The shape of the outer closure 23 results in the shedding of water, and the insulation used in the assembled structure is desirable in modifying the temperature changes bound to arise from the use of metal in forming the two shells.

These two shells may be made by ordinary can making machines and may have impressed thereon decorations suitable to adapt the container to the two uses for which it is intended. The use of tin plate or other substantially non-corrosive material and of exterior decorations tend to avoid objectionable erosion.

After the container has been abandoned by nesting birds, the inner shell may be removed and thoroughly cleansed, although new containers will be ordinarily readily available to replace old ones.

It is not my intention to limit the invention to the precise details of construction shown in the accompanying drawing, it being apparent that such may be varied without departing from the spirit and scope of the invention.

Having described the invention, what I claim as new and desire to have protected by Letters Patent, is:—

1. A container embodying therein inner and outer metal shells each having an open top, a liner of insulating material between said shells, said shells and said liner having openings therein, and said shells being relatively movable, whereby said openings may be brought into or out of registering position, a closure for said outer shell, complementary means upon said outer shell and said closure whereby said closure may be firmly connected with the shells, and means whereby said container may be supported out of doors.

2. A container embodying therein an outer metallic shell having an opening through the side wall thereof, an inner metallic shell of less height than, and movably positioned within, said outer shell and having an opening through the side wall thereof adapted to register with the opening in said outer shell, a liner of insulating material between said shells having an opening therethrough adapted to register with the openings in said shells, said outer shell having ventilator openings therethrough above said inner shell, a closure for said outer shell, complementary means upon said outer shell and said closure whereby said closure may be firmly connected with the shells, and means whereby said container may be supported out of doors.

3. A container embodying therein an outer metallic shell having an opening through the side wall thereof, an inner metallic shall of less height than, and movably positioned within, said outer shell and having an opening through the side wall thereof adapted to register with the opening in said outer shell, a liner of insulating material between said shells having an opening therethrough adapted to register with the openings in said shells, said outer shell having ventilator openings therethrough above said inner shell, a slip cover closure for said inner shell, a closure for said outer shell, complementary means upon said outer shell and said closure whereby said closure may be firmly connected with the shells, and means whereby said container may be supported out of doors.

4. A container embodying therein an outer metallic shell having an opening through the side wall thereof, an inner metallic shell of less height than, and movably positioned within, said outer shell and having an opening through the side wall thereof adapted to register with the opening in said outer shell, a liner of insulating material between said shells having an opening therethrough adapted to register with the openings in said shells, said outer shell having ventilator openings therethrough above said inner shell, a slip cover closure for said inner shell, a closure for said outer shell, complementary means upon said outer shell and said closure whereby said closure may be firmly connected with the shells, a handle upon the closure for said inner shell, means carried by the closure of said outer shell preventing displacement of the closure for said inner shell, and means whereby said container may be supported out of doors.

5. A container embodying therein inner and outer metallic shells each having an open top, a liner of insulating material between said shells, said shells and said liner having openings therein, and said shells being relatively movable, whereby said openings may be brought into or out of registering position, a closure for said outer shell, a tubular key member adapted to pass through said openings when in registered position, complementary means upon said outer shell and said closure whereby said closure may be firmly connected with the shells, and means whereby said container may be supported out of doors.

6. A container embodying therein inner and outer metal shells each having an open top, a liner of insulating material between said shells, said shells and said liner having openings therein, and said shells being relatively movable, whereby said openings may be brought into or out of registering position, a closure for said outer shell, a tubular key member adapted to pass through said openings when in registered position having a pendent portion carrying a small straight perch forming section, complementary means upon said outer shell and said closure whereby said closure may be firmly connected with the shells, and means whereby said container may be supported out of doors.

JAMES A. BRADY.